United States Patent
Gamishev et al.

(10) Patent No.: US 12,507,062 B2
(45) Date of Patent: Dec. 23, 2025

(54) METHOD FOR OBTAINING A COMMAND RELATING TO A NETWORK ACCESS PROFILE OF AN eUICC SECURITY MODULE

(71) Applicant: Orange, Issy-les-Moulineaux (FR)

(72) Inventors: Todor Gamishev, Chatillon (FR); Laurent Coureau, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 579 days.

(21) Appl. No.: 17/786,959

(22) PCT Filed: Dec. 4, 2020

(86) PCT No.: PCT/FR2020/052286
§ 371 (c)(1),
(2) Date: Jun. 17, 2022

(87) PCT Pub. No.: WO2021/123542
PCT Pub. Date: Jun. 24, 2021

(65) Prior Publication Data
US 2023/0044937 A1 Feb. 9, 2023

(30) Foreign Application Priority Data

Dec. 20, 2019 (FR) ..................................... 1915340

(51) Int. Cl.
*H04W 12/02* (2009.01)
*H04W 8/20* (2009.01)

(52) U.S. Cl.
CPC ........... *H04W 12/02* (2013.01); *H04W 8/205* (2013.01)

(58) Field of Classification Search
CPC ..... H04W 12/02; H04W 8/205; H04W 12/75; H04W 12/35; H04W 12/40; H04W 4/60; H04L 63/102; H04L 63/0853
(Continued)

(56) References Cited

U.S. PATENT DOCUMENTS 10,574,780 B2 * 2/2020 Park ........................ H04L 9/3234
11,533,160 B2 * 12/2022 Yang ........................ H04L 67/30
(Continued)

FOREIGN PATENT DOCUMENTS

WO 2018185435 A1 10/2018

OTHER PUBLICATIONS

English translation of the Written Opinion of the International Searching Authority dated Feb. 24, 2021 for corresponding International Application No. PCT/FR2020/052286, filed Dec. 4, 2020.
(Continued)

*Primary Examiner* — Juan A Torres
(74) *Attorney, Agent, or Firm* — David D. Brush; Westman, Champlin & Koehler, P.A.

(57) ABSTRACT

A method for obtaining a command relating to a network access profile of an eUICC security module incorporated into a communication device and associated with a physical identifier. The communication terminal: obtains the physical identifier and an anonymous identifier of the security module is calculated from the physical identifier and a random parameter; transmits a request to obtain the command, via an "operator server", to a "preparation server", the request to obtain including the anonymous identifier of the security module; obtains the random parameter and calculates the anonymous identifier from the physical identifier of the security module and the random parameter; and sends, to a "discovery server", a request to obtain information intended to obtain the command, this request to obtain information including the anonymous identifier, in order to obtain, in response, from the discovery server, an address of the preparation server.

6 Claims, 3 Drawing Sheets

(58) Field of Classification Search
USPC .......................................................... 455/411
See application file for complete search history.

(56) References Cited

U.S. PATENT DOCUMENTS

| | | | |
|---|---|---|---|
| 2016/0283216 A1* | 9/2016 | Gao | H04W 12/106 |
| 2018/0352432 A1* | 12/2018 | Barki | H04W 12/06 |
| 2019/0075453 A1 | 3/2019 | Yoon et al. | |
| 2020/0267521 A1* | 8/2020 | Bruner | H04L 9/0643 |
| 2020/0389439 A1 | 12/2020 | Gharout et al. | |
| 2020/0404501 A1* | 12/2020 | Kang | H04W 8/183 |

OTHER PUBLICATIONS

International Search Report dated Feb. 16, 2021 for corresponding International Application No. PCT/FR2020/052286, Dec. 4, 2020.
Written Opinion of the International Searching Authority dated Feb. 16, 2021 for corresponding International Application No. PCT/FR2020/052286, filed Dec. 4, 2020.
"SOG-IS Crypto Evaluation Scheme Agreed Cryptographic Mechanisms," SOG-IS Crypto Working Group, Version 1.1, Jun. 2018.
"Official Document SGP.22—RSP Technical Specification," GSM Association, Version 2.2, Sep. 1, 2017.

* cited by examiner

METHOD FOR OBTAINING A COMMAND RELATING TO A NETWORK ACCESS PROFILE OF AN eUICC SECURITY MODULE

CROSS-REFERENCE TO RELATED APPLICATIONS

This Application is a Section 371 National Stage Application of International Application No. PCT/FR2020/052286, filed Dec. 4, 2020, which is incorporated by reference in its entirety and published as WO 2021/123542 A1 on Jun. 24, 2021, not in English.

TECHNICAL FIELD

The present invention pertains to the general field of telecommunications. It relates more particularly to a method for obtaining a command relating to a telecommunications network access profile by way of a communication equipment.

The invention is notably applicable in particular in the context of the use of security modules embedded in what are called companion devices associated with mobile terminals, for example for loading a network access profile after subscribing to a service offering with a mobile network operator, or for remotely configuring or updating the profile, etc.

PRIOR ART

The association of mobile telephony operators denoted GSMA (Global System for Mobile Communications Association) is developing an embedded "SIM" (Subscriber Identity Module), or "eSIM", card standard of "eUICC" (embedded Universal Integrated Circuit Card) type for consumer mobile equipments, such as a mobile terminal or a tablet. An embedded SIM card is intended to be non-removable and remotely (re)programmable. Thus, when acquiring a new mobile equipment, it is no longer necessary to manipulate the SIM card beforehand in order to access an operator's network, or even to change it upon a change of operator. There is provision for a user to subscribe directly via the screen of his mobile equipment, or by visiting an outlet of the operator, and to load a network access profile from his mobile equipment, or even for him to change operator in the same way. An eSIM card is identified uniquely by means of a module identifier, denoted "EID" (eUICC identifier), which constitutes a physical identifier of the card that is defined in the factory and is not modifiable. This identifier is therefore considered to be a sensitive datum from a privacy protection point of view that is not able to be exposed without the consent of the user of the mobile equipment.

In the case for example of obtaining and loading an initial network access profile by way of a mobile equipment, the GSMA makes provision, when taking out a subscription with a mobile network operator, to manage, in an intermediate server of the network, usually called "discovery server" (or denoted SM-DS—Subscription Manager Discovery Server), independent of the operators, a correspondence between the identifier EID of an eUICC security module and the address of a "data preparation server" platform, called "SM-DP+" (Subscription Manager Data Preparation), chosen by the operator with which the subscription is taken out and by virtue of which the operator makes available an access profile generated for the module.

When a mobile equipment wishes to obtain a network access profile following a subscription to an operator, it addresses the intermediate server, SM-DS, which identifies, on the basis of the identifier EID of the security module of the mobile equipment, the address of the SM-DP+platform on which a profile has been generated for this equipment. The intermediate server then sends the mobile equipment the address of the SM-DP+ management server of the operator, from which the equipment is able to obtain its profile. The mobile equipment then establishes a connection to the management server of the operator so as to retrieve its profile and install it in the security module. This mode of operation requires sharing the identifier of the security module with the intermediate server of the network that stores correspondences between identifiers EID of security modules and management server addresses of operators that generate the network access profiles.

Such a solution offers a certain flexibility in terms of the management of subscriptions by the user, who is easily able to command the activation of an initial subscription, or of a new subscription in the case of changing operator, from his mobile equipment. However, this mode of operation requires sharing the identifier EID of the security module with the intermediate server of the network that stores correspondences between a security module identifier and a management server address of the operator that generated the network access profile. The intermediate server is thus capable of tracing the identifier EID of a security module and of jeopardizing the private data of the user of the mobile equipment. Moreover, the identifier EID of the security module is exposed, in particular to hacking, in the network, by being transmitted and/or shared between multiple network entities, without the user of the mobile equipment having given his consent at any time for this identifier to be disclosed, which identifier, which is not modifiable, is a sensitive datum whose protection against attempted fraud must be effective.

Patent document WO2018/185435A1 from the same applicant describes a method for obtaining a command relating to a network access profile by way of a mobile equipment, the command being intended to be implemented on a security module of the equipment. According to the described method, an information obtainment request intended to obtain the command is sent to a server, the request comprising an anonymous identifier of the security module; this anonymous identifier being computed from a physical identifier of the module and from a randomly obtained value.

Moreover, over the last few years, there has been a growth in what are called connected objects, that is to say objects capable, in addition to their main function, of sending or receiving information by way of a telecommunications network. Some of these connected objects may be coupled with a mobile telephony terminal such as a smartphone in order to provide additional functionalities. By way of example, a "connected watch" is a wirelessly connected digital watch that may be associated with a mobile terminal in order to use the main functionalities thereof (displaying information, configuring the watch from the mobile terminal, etc.).

On the other hand, a mobile communication terminal may also be associated with another communication terminal, called primary terminal, as a "companion" terminal, in order to be able to take advantage of the network interface or the human-machine interface of the primary terminal.

In order to be able to connect to the mobile network, a communication equipment, called secondary terminal, such as a connected watch or a companion terminal, is typically equipped with an eUICC security module, associated with an identifier EID, and the application (SIM) that resides in the eUICC card of the equipment must therefore be configured or parameterized with data from a subscriber profile to a telephony operator.

Moreover, as mentioned above with regard to a mobile telephony terminal equipped with an eUICC card, the physical identifier EID of the eUICC card of such a secondary terminal must remain secret in order to preserve the confidentiality of the personal data of the user of the equipment.

SUMMARY OF THE INVENTION

The present invention aims to improve the situation outlined above. Thus, according to a first aspect, the invention relates to a method for obtaining a command relating to a network access profile of an "embedded universal integrated circuit card" (eUICC) security module, the security module being incorporated in a communication equipment and being associated with a physical identifier (EID). According to the invention, the method comprises the following steps:

(a) obtaining, by way of a communication terminal, the physical identifier (EID) of the security module, and computing an anonymous identifier (TEID) of the security module from the physical identifier (EID) and a randomly obtained parameter (Pa), called random parameter;

(b) transmitting a command obtainment request, by way of the communication terminal, via a first server, called "operator server", to a second server, called "data preparation server", this obtainment request including the anonymous identifier (TEID) of the security module;

(c) obtaining, by way of the communication equipment, the random parameter (Pa) and computing the anonymous identifier (TEID) from the physical identifier (EID) of the security module and the random parameter;

(d) sending, by way of the communication equipment (20), to a third server, called "discovery server", an information obtainment request intended to obtain the command, the information obtainment request comprising the anonymous identifier (TEID), in order to obtain, in response, from the discovery server, an address of the command preparation server.

It should be noted here that the abovementioned communication terminal, for example a mobile telephone (smartphone), may be denoted "primary terminal", given that it is the communication terminal for which the user may have a telephony subscription with a telephony operator. However, according to another exemplary embodiment, the primary terminal may be a personal computer (PC) located for example in a commercial branch of a telecommunications operator, and used by a commercial adviser, an employee of the branch, to configure the network access profile of an additional equipment of a client, for example a connected object or an additional mobile telephone of the client; in this case, the primary terminal does not have an eUICC (eSIM) card or even a UICC (SIM) card, but only a software application dedicated to managing client subscriptions to the network and services of the operator. The abovementioned communication equipment—for example a connected object such as a connected watch, or a companion communication terminal—may for its part be denoted "secondary terminal".

Thus, by virtue of the method for obtaining a command as defined in brief above, the user of the primary communication terminal will be able to trigger the subscription or updating of a subscriber profile for a secondary communication terminal, using his primary terminal as a broker with the servers of the operator (abovementioned first and second servers) in a first phase of the method which results in the sending of a data obtainment request to the second server (data preparation server). In a second phase of the method, it is the secondary terminal, which, having obtained the random parameter instantiated and used by the primary terminal and having the function for computing the anonymous identifier used by the primary terminal in the first phase, is then able to obtain, from the third server (discovery server), the address of the second server in order to obtain the command to be executed in its security module.

There is therefore no need to load or pre-load a specific application of the telephony operator into the security module of the secondary terminal. Moreover, the primary and secondary terminals do not need to be able to communicate directly with one another (for example, no common protocol or pairing technique is necessary); indeed, it is the user who is involved, and therefore serves as an interface between the two terminals, in the first step (a) of obtaining the physical identifier (EID) of the security module of the secondary terminal by way of the primary terminal, and in step (c) of obtaining the random parameter (Pa) by way of the secondary terminal. In addition, the two primary and secondary terminals may originate from two different manufacturers and might not be compatible with one another, either from an operating system viewpoint or from a communication protocol viewpoint.

Advantageously, the method "for obtaining a command" according to the invention makes it possible to keep the physical identifier (EID) of the secondary terminal anonymous, since it is an anonymous identifier (TEID) computed from the physical identifier that is used in particular by the primary terminal in the abovementioned first phase of the method according to the invention.

Overall, the method "for obtaining a command" according to the invention makes it possible to facilitate the implementation in particular of loading subscriptions onto secondary terminals such as connected objects, for example in the context of the Internet of Things (IoT), by limiting the technical dependence between the secondary and primary terminals, and therefore between the providers of the various terminals.

According to one particular implementation feature of the method as briefly explained above, step (b) of the method comprises:

transmitting the command obtainment request, by way of the communication terminal, on a communication network, via the operator server, to the data preparation server;

preparing the command by way of the data preparation server and storing the command associated with the anonymous identifier (TEID); and, sending, to the discovery server, a prepared data information notification associated with the anonymous identifier (TEID), the discovery server consequently storing the address of the data preparation server, associated with the notification.

According to one particular embodiment of the method for obtaining a command, according to the invention, the abovementioned anonymous identifier (TEID) is computed by applying a one-way function to the physical identifier (EID) of the security module and to the random parameter, this one-way function also having a non-collision property.

It will be recalled here that a one-way function may be easily computed but is difficult to invert, that is to say, for any value of x whose image z=f(x) is known, it is very difficult to determine x In other words, it is very difficult to obtain the inverse function of the function f. The use of a one-way function for computing the anonymous identifier therefore makes it possible to guarantee the anonymity of the security module. Indeed, the physical identifier of the module (EID) cannot be deduced from the anonymous identifier. The non-collision property of the one-way function that is used moreover guarantees the uniqueness of the generated anonymous identifiers.

According to one particular feature of the method according to the invention, the method furthermore comprises:
  sending the anonymous identifier (TEID), by way of the communication equipment, to the data preparation server;
  receiving the prepared command from the data preparation server, after verification, by the data preparation server, of the authenticity of the anonymous identifier (TEID); and,
  executing the received command by way of the security module of the communication equipment.

According to one particular embodiment feature of the method, the method comprises mutual authentication between the security module and the discovery server, this authentication being representative of an agreement by the user to disclose the physical identifier of the security module of the communication equipment, to the discovery server.

In this exemplary embodiment, there is mutual authentication between the security module of the communication equipment and the discovery server. This authentication requires revealing the physical identifier EID of the security module to the discovery server. Therefore, this authentication, when it is implemented, constitutes implicit consent from the user to disclose the physical identifier of his security module.

According to one variant embodiment of the method, the method comprises anonymously authenticating the security module with the discovery server, implemented by means of a group signature algorithm.

Anonymous authentication based for example on a group signature algorithm makes it possible not to disclose the physical identifier EID of the security module of the communication equipment to the discovery server. However, this allows the server to determine, when the authentication is successful, that it is communicating with a valid security module.

According to a second aspect, the invention relates to a communication equipment comprising an eUICC security module associated with a physical identifier (EID). According to the invention, this equipment is noteworthy in that it is configured so as to:
  compute an anonymous identifier (TEID) from a random parameter obtained beforehand and the physical identifier (EID);
  send, to a server, called "discovery server", an information obtainment request intended to obtain a command relating to a network access profile, this information obtainment request comprising the anonymous identifier (TEID), in order to obtain, in response, from the discovery server, an address of another server, called "command preparation server".

According to one particular feature of the communication equipment explained above, it is furthermore configured so as to:
  send the random parameter and the physical identifier (EID) used to compute the anonymous identifier (TEID) to the data preparation server;
  receive the prepared command from the data preparation server, after verification, by the data preparation server, of the authenticity of the anonymous identifier (TEID), and
  execute the received command.

In practice, a communication equipment according to the invention ("secondary terminal") as briefly explained is configured so as to implement the method according to the invention by way of software modules. In particular, such an equipment, for example a connected object, has a software application (independent of the security module of the equipment), execution of which by a processor incorporated in the equipment makes it possible to implement the steps of the method according to the invention that are implemented by the equipment.

Therefore, according to a third aspect, the invention also targets a computer program, this program comprising program instructions the execution of which by a processor of the abovementioned communication equipment causes the implementation of the steps of the method according to the invention that are implemented in the communication equipment. Such a computer program according to the invention may use various programming languages, and comprise programs in the form of source code, object code, or intermediate code between source code and object code, such as in a partially compiled form, or in any other desirable form.

Finally, the invention also targets a computer-readable information recording medium on which there is recorded a computer program according to the invention. Such a recording medium may be formed by any entity or unit capable of storing such a program. For example, the medium may comprise a storage means, such as a ROM, for example a CD-ROM or a microelectronic circuit ROM, or else a removable recording means such as a USB key or a memory card, or a magnetic recording means, such as a hard disk. On the other hand, a software module or program according to the invention may, in particular, be downloaded from an Internet network.

The advantages provided by a communication equipment, a computer program, according to the invention, as briefly defined above, are identical to or contribute to those mentioned above in relation to the method "for obtaining a command relating to a network access profile of a security module", according to the invention, and will therefore not be repeated here.

BRIEF DESCRIPTION OF THE FIGURES

Other features and advantages of the present invention will become apparent from the following detailed description, which refers to the appended drawings, in which.

DETAILED DESCRIPTION

Figure 1:
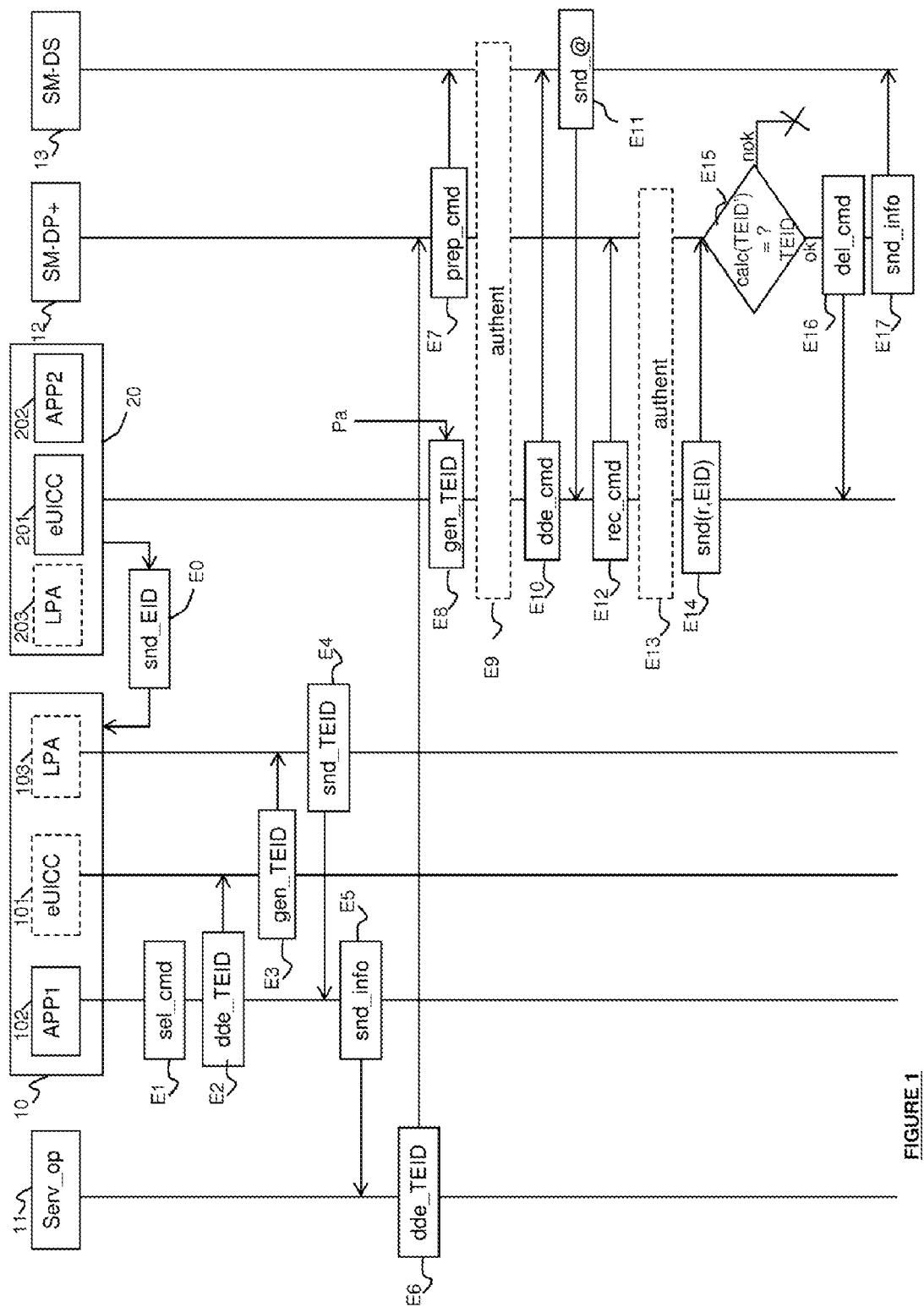
FIG. 1 shows the steps of a method for obtaining a command relating to a network access profile of a security module, according to one particular embodiment of the invention.

FIG. 1 shows a flowchart of the main steps of a method for obtaining a command relating to a network access profile by way of a communication equipment, according to one exemplary embodiment.

According to the exemplary embodiment of the invention chosen and illustrated in FIG. 1, the method is implemented between a communication terminal 10 and a communication equipment 20. The equipment 20 (also denoted "secondary terminal" in the present description) is for example a connected object such as a connected watch, or a companion device.

The communication terminal 10 (also denoted "primary terminal" in the present description) in the illustrated example is a "smartphone" mobile terminal or a tablet, and is equipped with an eUICC embedded security module 101, or with a removable security module (SIM card). However, according to another exemplary implementation of the invention, the terminal 10 may also be a personal computer (PC) located for example in a commercial branch of a telecommunications operator, and used by a commercial adviser, an employee of the branch, to configure the network access profile of the equipment 20 of a client, for example a connected watch or a second mobile telephone of the client. In this case, the terminal 10 does not have an eUICC card, but only a software application APP1 and an Internet network connection.

Therefore, according to the embodiment of the method according to the invention, the user of the terminal 10 and of the equipment 20 may be for example the abovementioned adviser of a commercial branch, or else, when the communication terminal 10 is a mobile telephone (smartphone), the subscriber to the mobile network of the telecommunications operator, for the eUICC card of the terminal 10.

In the embodiment described below, the communication terminal 10 is a smartphone mobile telephone, and comprises functional modules similar to those described in document WO2018/185435A1 mentioned above, in relation to the "mobile equipment" (10) described in this document.

In the embodiment shown in FIG. 1, the communication terminal 10 comprises a security module 101, in this example an eUICC card, and is identified by a physical card identifier EID (eUICC Identifier), defined in the factory. The communication terminal 10 also comprises a software application 102 (APP2)—in the present case, an application for a mobile telephone, denoted "mobile application"—designed to allow the user to initiate and/or validate a command relating to a telecommunications network access profile. The mobile application 102 is provided by a service provider, for example a mobile network operator. The access profile is intended to allow the user to access the network from the communication terminal 10. To this end, the application 102 is designed to communicate, to a first server 11, called "operator server", data that comprise physical features of the communication terminal 10 and of the security module 101, and data corresponding to the command relating to the access profile and validated by the user.

The operator server 11 is designed to ask a second server 12, called "data preparation server", to prepare the command relating to the network access profile for a security module of the type of that of the communication terminal 10. The data preparation server 12 is designed to prepare the command that it has received and to notify a third server 13, called "discovery server", that an event is pending for a security module that it designates by means of an anonymous identifier. This event notification makes it possible to indicate to the discovery server 13 that a command relating to an access profile has been prepared and is available on the preparation server 12, without providing information with regard to the content of this command to the discovery server 13. "Available command" means that the command is able to be retrieved in order to be implemented on the terminal 10.

More precisely, the abovementioned servers 12 (data preparation server) and 13 (discovery server) are respectively denoted "SM-DP+" (Subscription Manager Data Preparation) and "SM-DS" (Subscription Manager Discovery Server), in the GSMA "SGP.22" specification (RSP Technical Specification—Version 2.2—1 Sep. 2017), which describes an architecture for remote profile provisioning (RSP—Remote SIM Provisioning).

The terminal 10 is also designed to address the discovery server 13 in order to obtain the address of the data preparation server 12 that prepared the command relating to the access profile. The terminal 10 is thus able, after obtaining the address of the data preparation server 12, to request, from the data preparation server 12, the command relating to the profile, such as the initial loading of the profile or the execution of the configuration or an update of an already installed profile. Once it has been obtained, the command relating to the profile is executed on the security module 101.

The communication terminal 10 also comprises a local profile manager 103, or LPA (for "Local Profile Assistant"). Conventionally, the local profile manager 103 provides the user of the communication terminal 10 with an administrative interface for the terminal 10. In the case for example of loading a network access profile on the communication terminal 10, the local profile manager 103 is designed to retrieve the profile from the operator via a secure Internet connection to the data preparation server 12 and to command installation thereof and activation thereof on the security module 101. In one exemplary embodiment, the local profile manager 103 is located in the security module 101. It is thus designed to perform computations, and in particular to generate anonymous identifiers TEID, under the control of the mobile application 102. However, unlike the mobile equipment described in abovementioned document WO2018/185435A1, the mobile application APP1 (102) of the communication terminal 10 is, according to the present invention, configured so as to generate an anonymous identifier TEID from a physical identifier EID provided by an input/output interface of the terminal.

Still in FIG. 1, the communication equipment 20 (also denoted "secondary terminal" in the present description), for example a connected object such as a connected watch, or what is called a "companion" mobile terminal, has a security module 201, in this case an eUICC card, a software application APP2 202, and also, where applicable, a local profile manager 203 that communicates with the security module 201 in the same way as the local profile manager (103) of the primary terminal 10, as explained above. The application 202 is configured, according to the invention, so as to communicate with the eUICC card 201, and in particular to obtain its physical identifier EID, and also to compute an anonymous identifier TEID from the physical identifier (EID) of the security module 201 and a random parameter Pa provided beforehand via an input/output interface of the equipment 20.

The process, according to the invention, for obtaining a command relating to a network access profile of the security module 201 of the communication equipment 20 takes place in two successive phases: a first phase implemented essentially by the communication terminal 10 and a second phase implemented by the equipment 20.

"Command relating to an access profile" is understood to mean a command comprising code instructions intended to be executed on the security module 201. For example, the command consists in loading the network access profile on the security module and in activating the profile after the user has subscribed to an associated service offering with an operator, or in configuring or updating the access profile loaded beforehand in the security module 201, following the validation of this configuration or this update by the user.

The first phase begins with an initial step E0 (snd_EID) during which the user of the equipment 20 opens the application APP2 202 and interacts, for example through touch, with a user interface of the application so as to cause the screen of the equipment 20 to display the identifier EID of the security module 201 (eUICC card) of the equipment 20. During this same step, the user also opens the application APP1 102 of the mobile terminal 10 and triggers, through a command on the terminal (via a touch interaction for example), the obtainment of the identifier EID of the eUICC card 201 by the application APP1 of the terminal 10. In practice, the identifier EID may be transferred from the equipment 20 to the terminal 10 for example through manual copying (via keypad or touchscreen) by the user, or else by using a reader for reading barcodes (or similar codes) associated with the application APP1 in the terminal 10, the identifier EID being displayed in the form of barcodes (or similar codes) on the screen of the equipment 20. According to another example, such a barcode may be displayed on a box containing the equipment, when this equipment is purchased in an outlet.

In the exemplary embodiment using a barcode reader, the identifier EID is associated, in the barcode, with information relating to the physical features of the equipment 20 and of the security module 201. The physical features relate for example to the size of the screen of the equipment 20, the NFC (near-field communication) communication capabilities of the equipment 20, the size of the memory of the security module 201, the operating system version, etc. These physical features are intended to be taken into account by the preparation server 12 during the preparation of the command relating to the profile, such that this is adapted to the equipment 20 and to the security module 201 on which it should be executed. Thus, at the end of step E1, the application APP1 of the terminal 10 has the identifier EID of the eUICC card 201 of the equipment 20, along with the abovementioned associated information.

In following step E1 (sel_cmd), the user selects, on the mobile terminal 10, by way of the mobile application 102, a command relating to a network access profile, such as for example taking out a subscription or initially loading—that is to say obtaining and activating the network access profile that will have to be applied to the equipment 20, configuring the profile, updating rules relating to the profile ("policy rules"), or else a profile maintenance operation, etc.

During following step E2, the application 102 sends, to the security module 103, the identifier EID, obtained in step E0, of the eUICC card 201 of the equipment 20, associated with a request (dde_TEID) to generate an anonymous identifier (TEID) from the identifier EID. However, according to another embodiment in which the terminal 10 does not have an eUICC card, for example when the terminal 10 is a personal computer, it is the application 102 itself that generates the anonymous identifier (TEID) from the identifier EID.

In the following step, E3, the security module 101 receives the anonymous identifier generation request and computes an anonymous identifier TEID from the received physical identifier EID. For this purpose, it generates a random parameter (Pa) r for example by means of a pseudo-random generator and applies a one-way function f to the random parameter rand to the physical identifier EID, using the following equation:

$$TEID=f(EID,r)$$

It will be recalled that a one-way function is a function that may be easily computed but that is difficult to invert, that is to say, for any number x whose image f(x) is known, it is very difficult to find x. The one-way function f is for example a hash function, known to be non-invertible, such as SHA-3 or SHA-256 (SHA: Secure Hash Algorithm). If the one-way function is SHA-256, it is possible, in one exemplary embodiment, to take only the 32 first digits, or the 32 last digits, of the result of the hash function. This makes it possible to take into account size constraints on one or more servers. Indeed, a security module identifier is a value coded on 32 digits. Taking the 32 first or last digits makes it possible to obtain anonymous identifiers of the same size as the physical module identifiers. The invention is of course not limited to these functions; it is possible for example to use the functions recommended by the SOGIS federation (Senior Officials Group Information Systems Security) and described in the document accessible via the following link: https://www.sogiseu/documents/cc/crypto/SOGIS-Agreed-Cryptographic-Mechanisms-1.1.pdf The use of a hash function to compute the anonymous identifier of the security module 101 makes it possible to guarantee the anonymity of the module 101. The function (also has the non-collision property, that is to say that, for any value of x whose image f(x) is known, it is very difficult to find y such that: f(x)=f(y). This property is satisfied in that a datum at the input of the function has a size smaller than or equal to the output datum. This property guarantees the uniqueness of the generated anonymous identifiers.

The anonymous identifier TEID thus computed is sent to the local profile manager 103 at the end of step E3. In step E4, the anonymous identifier TEID is stored by the local profile manager 103, and then transmitted to the mobile application 102, along with the random parameter (Pa).

In following step E5, the mobile application 102 sends, to the operator server 11, the information regarding the physical features of the equipment 20 and of the security module 201 that it obtained at the end of step E1, the generated anonymous identifier TEID and the command relating to the network access profile, selected by the user in step E1.

In following step E6, the operator server 11 sends, to the data preparation server 12, a preparation request (dde_TEID) that comprises the anonymous identifier TEID and the information necessary to prepare the command relating to the network access profile. This information comprises the selected command and the physical features of the equipment 20 and of the module 201.

In a following preparation and sending step E7 (prep_cmd), the data preparation server 12 prepares the command relating to the access profile and that is adapted to the equipment 20. "Prepare the command" is understood to mean the action of generating a software module comprising a set of code instructions intended to be executed by the security module 201. The preparation server 12 also sends a notification associated with the anonymous identifier TEID of the security module 201 to the discovery server 13. The notification is intended to inform the discovery server 13 that a command has been prepared for a security module whose anonymous identifier is TEID and is available on the data preparation server 12. The discovery server 13 stores that an event is pending for the anonymous identifier TEID of the security module 201; it also stores the address of the data preparation server 12 able to provide the command associated with this event.

In the second phase of the method described below, the method according to the invention continues with steps implemented by the equipment 20.

Thus, during step E8 (gen_TEID), the equipment 20 obtains the random parameter Pa used in the first phase of the method (step E3) and computes an anonymous identifier from its physical identifier EID and the obtained random parameter Pa, using the same one-way function f as in step E3 described above. Since the computing is performed with the same physical identifier EID (that of the eUICC module 201), the same random parameter Pa and using the same function f, the result, that is to say the anonymous identifier that is obtained, is identical to the anonymous identifier TEID computed in the terminal 10 during step E3 above.

More precisely, in step E8, the application APP2 of the equipment 20 receives the random parameter Pa, either directly through a manual input from the user of the equipment 20 (the commercial adviser or the user-subscriber mentioned above), via a user interface linked to the application APP2, or by reading a barcode (or equivalent code) displayed on the screen of the communication terminal 10, via an application for reading such codes associated with the application APP2; the identifier EID of the eUICC card (201) of the equipment 20 along with the abovementioned function f being provided directly by the application APP2 via the eUICC card and, where applicable, the local profile manager (LPA) 203, interfacing with the eUICC card.

The following steps are executed following an intentional action by the user, or automatically, for example after restarting of the equipment 20 or after regular refreshing implemented in the equipment 20, the command relating to the network access profile is then executed following exchanges between the equipment 20, the discovery server 13 and the data preparation server 12.

Thus, in optional following authentication step E9, mutual authentication between the security module 201 and the discovery server 13 is implemented. The steps of this authentication are described in the GSMA SGP.22 specification mentioned above. It should be noted that step E9 is optional in this case in that, when it takes place, the security module 201 provides its physical identifier EID to the discovery server 13 in accordance with the SGP.22 specification. It is considered in this case that the user, by taking part in this authentication, implicitly consents to disclosing the physical identifier EID of the security module 201. This step, when it is not executed, does not impact the security of the method. Indeed, the discovery server 13 at this stage is only aware of an anonymous and random identifier of a security module that it is not able to link to a physical module identifier EID and/or to a security module for which it has already been called upon. The anonymity of the security module 201 with respect to the discovery server 13 is thus ensured. In another exemplary embodiment, the optional authentication implemented during step E9 is anonymous. It is based for example on a group cryptographic signature. In this case, the discovery server 13 has the guarantee that the security module 201 that authenticated itself is a valid eUICC module; the discovery server 13 however does not know the identifier EID of the module 201.

In following information request step E10 (dde_cmd), the application APP2 202 sends a request to obtain information relating to one or more events regarding the security module 201 to the discovery server 13. Indeed, the equipment 20 is initially configured with the address of the discovery server as the recipient of such information obtainment requests; this address is stored in a memory of the equipment 20, for example in the eUICC card 201, or in the LPA module 203 (when it exists), or else in the application APP2. The information obtainment request comprises the anonymous identifier TEID that the application 202 stored during step E8 of generating the anonymous identification.

In following response step E11, the discovery server 13 sends (snd_@) the address of the data preparation server 12 that was stored in association with the anonymous identifier TEID received during step E7 to the application 202 of the equipment 20.

In following step E12, the application 202 of the equipment 20 connects securely to the data preparation server 12, the address of which was provided thereto in the previous step. The connection is for example compliant with the protocol known by the acronym TLS (Transport Layer Security). The application 202 provides the temporary anonymous identifier TEID of the security module 201 to the data preparation server 12 in order to retrieve the command relating to the access profile and prepared by the data preparation server 12 during step E7 for the security module 201.

The following step E13 is a step of mutual authentication between the security module 201 and the data preparation server 12, and is implemented in accordance with the GSMA SGP.22 specification mentioned above. At this stage, the security module 201 of the equipment 20 has the guarantee of dialoging with a legitimate data preparation server, and the data preparation server 12 has the guarantee of dialoging with a legitimate security module. However, even though it knows the physical identifier EID of the module that authenticated itself, the preparation server is not able to determine the anonymous identifier to which the identifier EID corresponds.

In a following "sending of proof" step E14, the security module 201 sends the random parameter r used to compute the anonymous identifier TEID of the module 201 during step E3 described above, and possibly its physical identifier EID, to the data preparation server 12. It should be noted that the identifier EID of the module 201 is retrieved by the data preparation server 12 during authentication step E13. This sending is intended to allow the data preparation server 12 to identify the security module associated with the anonymous identifier TEID. This sending also constitutes a request by the security module 201 to obtain the command. Moreover, this sending also constitutes proof, for the data preparation server 12, that the temporary identifier TEID for which the command relating to the access profile has been prepared actually corresponds to the physical identifier EID of the security module 201 that is requesting the command.

In a following computing and verification step E15, the data preparation server 12 computes a control identifier, denoted TEID', from the physical identifier EID and the random parameter r that it received at the end of the previous step E14. To this end, the data preparation server 12 applies the same one-way function f as that used by the security module 201 during generation step E3 and applied to the physical identifier EID and to the random parameter r received during step E14. The data preparation server 12 then verifies whether or not the computed control identifier TEID' is equal to the temporary anonymous identifier TEID provided by the equipment 20 during authentication step E13.

Thus, if it is determined that the control identifier TEID' is equal to the temporary identifier TEID (E15, "ok"), the data preparation server 12 delivers, to the security module 201 in step E16 (del_cmd), the command that it prepared (step E7) for execution thereby. The data preparation server 12 thus delivers the command that has been prepared only to the security module 201 for which it was initially requested by the operator server 11 (step E6).

Otherwise, that is to say if it is determined that the control identifier TEID' does not correspond to the anonymous identifier TEID (E15, "nok"), the method stops. Indeed, in this case, this means that the security module that sent its identifier (EID) during step E14 in order to obtain a command is not the one for which the command was initially prepared following the preparation request sent by the operator server 11 (step E6).

In step E17 following delivery of the command to the security module 201, the data preparation server 12 sends (snd_info), to the discovery server 13, what is called a release message intended to inform it that the command relating to the profile associated with the anonymous control identifier TEID' has been processed. The discovery server 13 is then able to delete the event that it created and stored for the anonymous identifier TEID' at the end of step E7.

According to one variant embodiment, step E12 of accessing the preparation server, during which the application 203 of the equipment 20 connects to the data preparation server 12 and provides it with the temporary identifier TEID of the security module 201, is not implemented. Indeed, according to this variant, the data preparation server 12 obtains the physical identifier EID of the security module 201 during authentication step E13. It also obtains the random parameter r during sending of proof step E14. It then computes, during computing and verification step E15, a new anonymous identifier TEID" from the random parameter r and the identifier EID that were received previously, and verifies the presence of this anonymous identifier TEID" in a database containing the anonymous identifiers for which commands are pending. The uniqueness of the anonymous identifiers, which is inherent to the use of the one-way function (that has the non-collision property, guarantees that the computed anonymous identifier (TEID") is associated with a legitimate security module physical identifier (EID).

Figure 2:
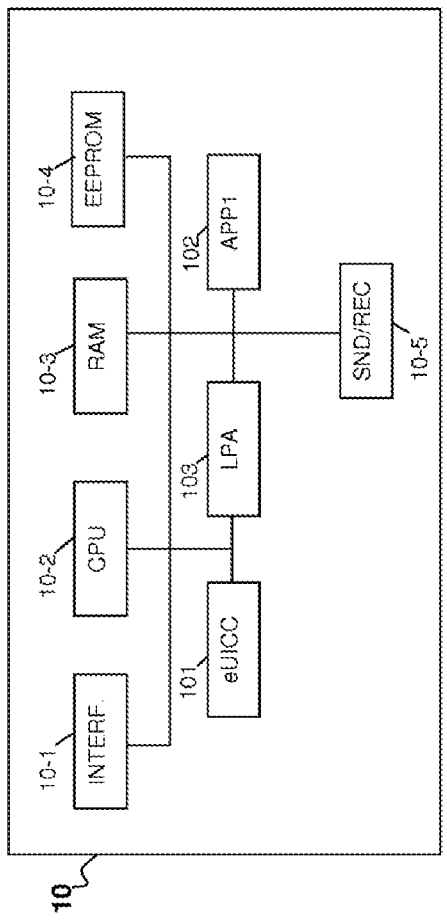
FIG. 2 is a schematic depiction of a communication terminal configured so as to implement some of the steps of the method for obtaining a command relating to a network access profile, according to one exemplary embodiment.

FIG. 2 is a schematic depiction of a communication terminal (10) configured so as to implement some of the steps (E1-E6) of the method for obtaining a command relating to a network access profile, as described above. The communication terminal 10 is for example a mobile terminal or a tablet.

As shown in FIG. 2, the communication terminal 10 comprises:
- a radio interface 10-1, designed to serve as an interface with a mobile communication network;
- a microprocessor 10-2, or CPU (central processing unit), designed to load instructions into memory, to execute them and to perform operations;
- a set of memories, including a volatile memory 10-3, or RAM (random access memory) used to execute code instructions, store variables, etc.;
- an EEPROM (electronically-erasable programmable read-only memory) storage memory 10-4.

The storage memory 10-4 is designed to store data and applications. In particular, the storage memory 10-4 stores a software module comprising code instructions for implementing steps E1 to E6 of the method for obtaining a command that are explained above;
- a security module 101, for example an eUICC module, designed to store and process sensitive data, such as keys and cryptographic algorithms. In particular, the security module is designed to execute commands relating to a network access profile that comprises these sensitive data. For example, a command may consist in loading a network access profile after subscription to a service offering from a network operator, in configuring or in updating the profile, etc.;
- a local profile manager 103, designed to provide the user of the terminal 10 with an administrative interface for the terminal 10. For example, in the case of loading a network access profile on the terminal 10, the local profile manager 103 is able to retrieve the profile from the operator via a secure Internet connection to the data preparation server 12 and to command installation thereof and activation thereof on the security module 101;
- a mobile application APP1 102, designed to provide an interface from which the user of the terminal 10 is able to give commands relating to the network access profile, such as taking out a subscription with an operator, requesting a configuration or an update of a network access profile, etc.

The mobile application 102 is provided by a service provider, for example a mobile network operator, and it is coupled with the storage memory 10-4 and with a module 10-5 for receiving/transmitting information and/or requests, such as command obtainment requests, from/to the above-mentioned servers, that is to say the operator server 11, the data preparation server 12, and the discovery server 13. Furthermore, according to one exemplary embodiment, the communication terminal 10 furthermore comprises a module for reading a barcode or more generally a two-dimensional code, integrated in or associated with the application APP1, and making it possible in particular to read (step E0) a two-dimensional code displayed by the equipment 20, which code represents the physical identifier (EID) of the security module 201 of the equipment 20.

Figure 3:
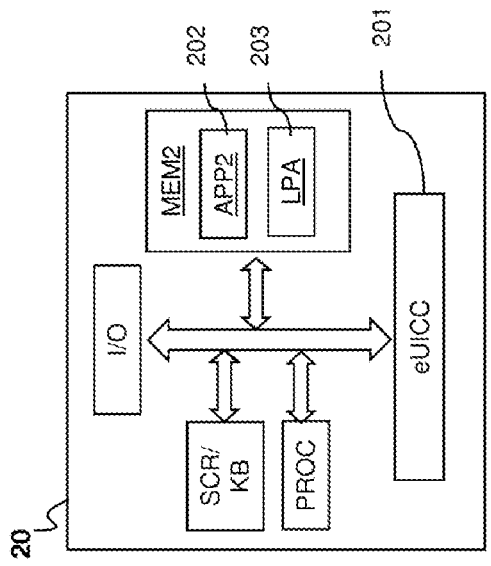
FIG. 3 is a schematic depiction of a communication equipment configured so as to implement some of the steps of the method for obtaining a command relating to a network access profile, according to one exemplary embodiment.

FIG. 3 shows the communication equipment 20 of FIG. 1 in more detail. The equipment 20 is configured according to the invention so as to implement steps E0 and E8-E17 of the method for obtaining a command described above.

The equipment 20, for example a connected watch, in particular comprises the following functional modules:
- an eUICC security module 201;
- an input/output communication module "I/O", intended to communicate with a communication network such as a mobile network;
- a processor module "PROC" associated with an operating system (not shown), for example the Android™ operating system from Google, managing the interaction between the various modules and the processor of the equipment 20;

a display device such as a screen associated with a user input/output device, for example a touch keypad: "SCR/KB";

a memory module "MEM2" storing an application or software module 202 (APP2) according to the invention, configured so as to implement steps E0 and E8-E17 of the method according to the invention;

a local profile manager (LPA) module 203, implemented or not implemented according to requirements and the type of equipment 20: connected object equipment or "companion" communication terminal.

By virtue of the abovementioned constituent modules, the equipment 20 is thus configured in particular so as to: display, on a screen of the equipment 20, the identifier EID of the security module 201 in the form of a two-dimensional code for example; compute (E8) an anonymous identifier (TEID) from a random parameter (Pa) obtained beforehand and the physical identifier (EID); send (E10), to the discovery server (13), an information obtainment request intended to obtain a command relating to a network access profile, this request comprising the anonymous identifier (TEID), in order to obtain, in response, from the discovery server, an address of the command preparation server (12); send (E14) the random parameter (Pa) and the physical identifier (EID) used to compute the anonymous identifier (TEID) to the preparation server (12); receive (E16) the prepared command from the data preparation server (12) after verification (E15), by the preparation server (12), of the authenticity of the anonymous identifier (TEID); and execute the command.

Figure 4:
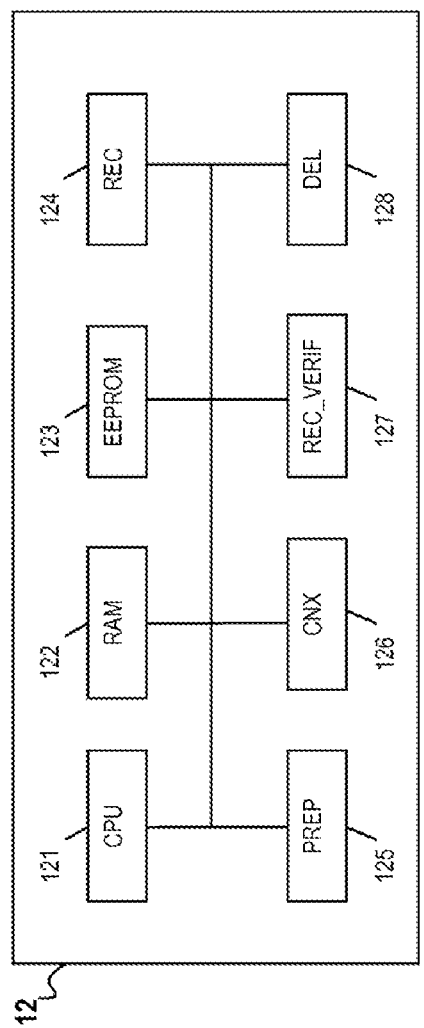
FIG. 4 is a schematic depiction of a data preparation server, able to implement some of the steps of the method for obtaining a command relating to a network access profile, according to one exemplary embodiment of the invention.

FIG. 4 is a schematic depiction of a data preparation server (12), able to implement some of the steps of the method for obtaining a command relating to a network access profile, according to one exemplary embodiment of the invention.

The server 12 is a computer equipment, accessible from a communication network such as the Internet. It comprises in particular:

a processing unit 121, or CPU, intended to load instructions into memory, to execute them, to perform operations, under the control of an operating system (not shown);

a set of memories, including a volatile memory 122, or RAM, used to execute code instructions, store variables, etc., and an EEPROM storage memory 123; in particular, the storage memory 123 is designed to store a software module for providing a command relating to a network access profile, which comprises code instructions for implementing those of the steps of the method for obtaining a command relating to an access profile that are implemented by the server 12, as explained above.

The server 12 also comprises the following functional modules:

a reception module (REC) 124, configured so as to receive (step E7), from the operator server 11, a command request associated with an anonymous security module identifier (TEID);

a preparation module (PREP) 125, configured so as to prepare (step E7) a command following the receipt of a request and to send (step E7), to the discovery server 13, a notification intended to indicate that the command has been prepared, this notification comprising the address of the server 12 and the anonymous identifier (TEID);

a connection module (CNX) 126, configured so as to accept connection of a communication equipment, the address of the server 12 having been provided beforehand to this communication equipment by the discovery server 13. The connection module 126 is thus configured so as to implement step E12 of the method described above;

a reception and verification module 127 (REC_VERIF), designed to receive, from a communication equipment such as the equipment 20, a physical identifier of the security module 201 of the equipment 20 and a random parameter (Pa), and to verify that the anonymous identifier (TEID) received beforehand from the equipment 20 has been computed from the physical identifier (EID) of the module 201 and the corresponding random parameter (Pa). The reception and verification module 127 is thus configured so as to implement step E15 of the method for obtaining a command, as described above;

a delivery module (DEL) 128, designed to deliver the command to the communication equipment 20 when the verification is positive. The delivery module 128 is thus designed to implement step E16 of the method described above.

In practice, the abovementioned reception module 124, preparation module 125, connection module 126, reception and verification module 127 and the delivery module 128 are software modules comprising computer program instructions that, when they are executed by a processor of the server 12, cause the implementation of the steps of the method for obtaining a command relating to a network access profile as described above that are implemented by the server 12.

The invention claimed is:

1. A method for obtaining a command relating to a network access profile of an "embedded universal integrated circuit card", eUICC, security module, said security module being incorporated in a communication equipment and being associated with a physical identifier, EID, the method comprising:

(a) obtaining, by way of a communication terminal, the physical identifier EID of said security module, and computing an anonymous identifier, TEID, of the security module from the physical identifier EID and a randomly obtained parameter, Pa, called random parameter;

(b) transmitting a command obtainment request, by way of said terminal, via a first server, called "operator server", to a second server, called "data preparation server", said obtainment request including the anonymous identifier TEID of the security module; followed by preparing the command by the data preparation server and the data preparation server storing the command associated with the anonymous identifier TEID; and followed by the data preparation server sending, to a third server, called "discovery server", a prepared command information notification associated with the anonymous identifier TEID, the discovery server consequently storing the address of the data preparation server associated with the notification;

(c) obtaining, by way of the communication equipment, the random parameter Pa and computing the anonymous identifier TEID from the physical identifier EID of the security module and the random parameter Pa;

(d) sending, by way of the communication equipment, to "the discovery server", an information obtainment request intended to obtain the command, said information obtainment request comprising the anonymous identifier TEID, in order to obtain, in response, from the discovery server, an address of the data preparation server.

2. The method as claimed in claim 1, wherein said anonymous identifier TEID is computed by applying a one-way function to the physical identifier EID of the security module and to the random parameter Pa, said one-way function also having a non-collision property.

3. The method as claimed in claim 1, comprising:
sending the random parameter Pa and the physical identifier EID used to compute the anonymous identifier TEID, by way of said communication equipment, to the data preparation server;
receiving the prepared command from the data preparation server, after verification, by the data preparation server, of the authenticity of the anonymous identifier TEID; and
executing the received command by way of the security module.

4. The method as claimed in claim 1, comprising mutual authentication between the security module and the discovery server, said authentication being representative of an agreement of the user to disclose the physical identifier of the security module to the discovery server.

5. The method as claimed in claim 1, comprising anonymous authentication of the security module with the discovery server, implemented by using a group signature algorithm.

6. A plurality of non-transitory computer readable information media on which there are recorded a computer programs comprising program instructions which when executed implement a method for obtaining a command relating to a network access profile of an "embedded universal integrated circuit card", eUICC, security module, said security module being incorporated in communication equipment and being associated with a physical identifier, EID, the computer programs comprising a first program executed by a processor of the communication equipment, a second program executed by a processor of a communication terminal, a third program executed by a processor of an operator server, a fourth program executed by a data preparation server and a fifth program executed by a discovery server, the method comprising:

(a) obtaining, by way of the communication terminal, the physical identifier EID of said security module, and computing an anonymous identifier, TEID, of the security module from the physical identifier EID and a randomly obtained parameter, Pa, called random parameter;

(b) transmitting a command obtainment request, by way of said communication terminal, via the operator server, to the data preparation server, said obtainment request including the anonymous identifier TEID of the security module; followed by preparing the command by the data preparation server and the data preparation server storing the command associated with the anonymous identifier TEID; and followed by the data preparation server sending, to the discovery server, a prepared command information notification associated with the anonymous identifier TEID, the discovery server consequently storing the address of the data preparation server associated with the notification;

(c) obtaining, by way of the communication equipment, the random parameter Pa and computing the anonymous identifier TEID from the physical identifier EID of the security module and the random parameter Pa;

(d) sending, by way of the communication equipment, to the discovery server, an information obtainment request intended to obtain the command, said information obtainment request comprising the anonymous identifier TEID, in order to obtain, in response, from the discovery server, an address of the data preparation server.

* * * * *